United States Patent Office 3,405,992
Patented Oct. 15, 1968

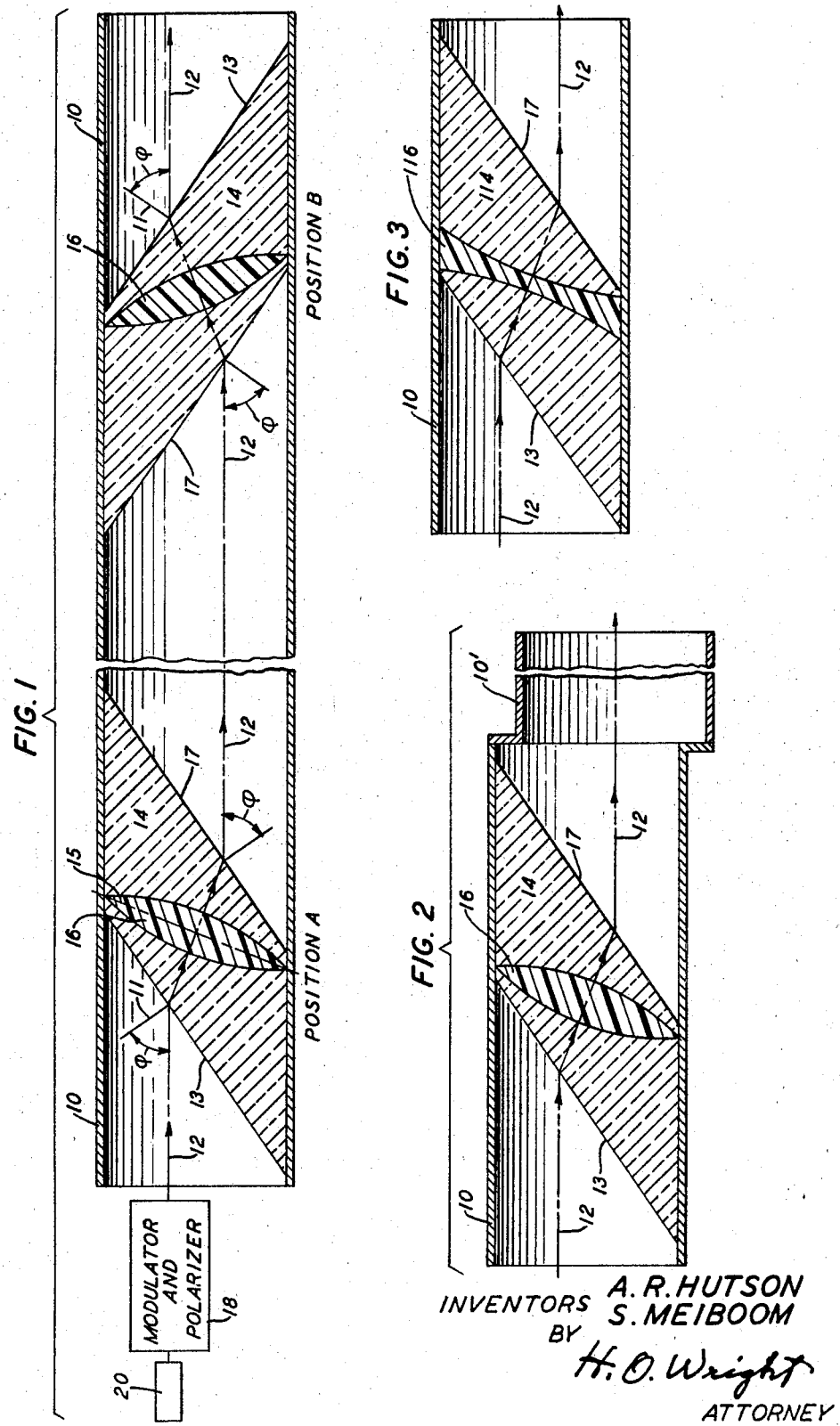

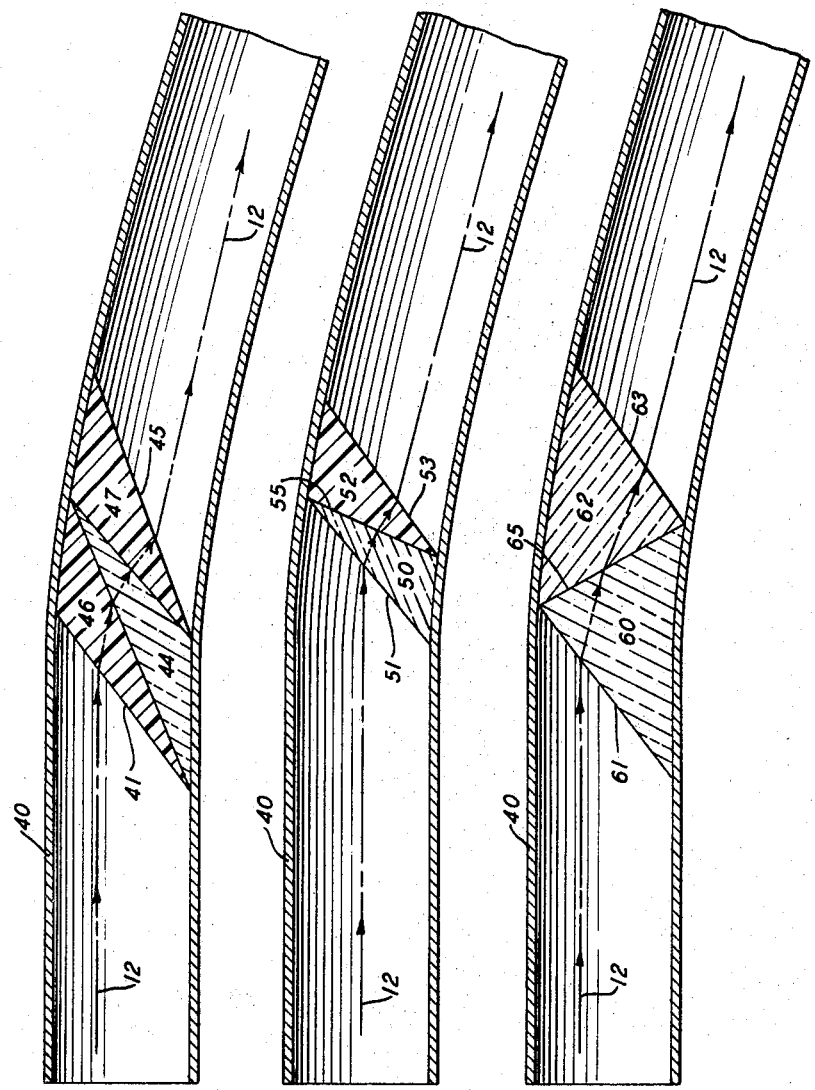

3,405,992
LOW REFLECTION LENSES AND PRISMS
Andrew R. Hutson, Summit, and Saul Meiboom, Berkeley Heights, N.J., assignors to Bell Telephone Laboratories, Incorporated, New York, N.Y., a corporation of New York
Filed Nov. 10, 1964, Ser. No. 410,193
3 Claims. (Cl. 350—147)

ABSTRACT OF THE DISCLOSURE

By embedding a lens or a prism in a material having a refractive index only moderately different than that of the lens or prism, and by orienting the exposed surfaces of the embedding material at the Brewster angle with respect to the path of the guided beam, substantially none of the beam energy is lost due to spurious reflections.

---

This invention relates to directing means for beams of ultrahigh frequency electromagnetic wave energy. More particularly, it relates to beam directing means such as lens and prism arrangements having low reflection losses, and to lenses having long focal lengths and to prisms having small deflection angles.

Beam directing means such as lenses and prisms of the above indicated types will be extremely useful in the long distance transmission of ultrahigh frequency electromagnetic wave beams as, for example, laser beams or the like, particularly where transmission is to take place substantially along the axis of an enclosing conduit and spreading of the beam and scattering of its rays should be reduced to a minimum.

The use of solid homogeneous lenses and prisms (that is, devices of a single refractive material) distributed along an enclosing conduit in the general manner contemplated in connection with systems of the present invention has been proposed in the prior art but major difficulties caused principally by reflection of energy at the solid surfaces have been found to render such systems impracticable.

In accordance with the principles of the present invention, it is proposed to substantially decrease the reflection at lens or prism surfaces by employing a linearly polarized beam and constructing composite lens and/or prism arrangements comprising a plurality of portions of different transparent substances having refractive indices which differ moderately from each other. The resulting composite devices are furthermore shaped to present entrance and exit surfaces for the prescribed beam path which are at the Brewster angle in a prescribed plane of polarization with respect to the propagation path of the beam. Where a sequence of such composite devices is employed, in some instances, alternate clockwise and anticlockwise rotations of the devices may be employed to avoid an accumulation of displacements of the beam path as will be discussed in more detail hereinunder.

For beams polarized parallel to the plane of incidence, no reflection of a beam impinging at the Brewster angle will take place at the external surfaces of the composite device and, since the refractive indices of the plurality of portions of which the composite device consists do not differ substantially, little reffection will take place at the interfaces between the portions of the device.

In some instances, as will be described in detail hereinunder, it is even possible to also orient the interface surfaces within a composite device at the Brewster angle.

The interface surfaces may, in addition, be coated by transparent materials to further reduce reflection in accordance with principles well known and extensively used by those skilled in the art.

Accordingly, a principal object of the invention is to substantially reduce the reflection of energy at the surfaces of lenses and prisms employed to focus and direct laser beams and the like.

A further object is to facilitate the construction of long focal length lenses and of prisms having relatively small deflection angles.

Other and further objects, features and advantages of the invention will become apparent from a perusal of the following specification, and the appended claims, taken in conjunction with the accompanying drawing in which:

FIG. 1 diagrammatically exemplifies portions of a beam transmission system employing composite lens arrangements of the invention;

FIG. 2 diagrammatically exemplifies another portion of a beam transmission system employing a composite lens arrangement of the invention;

FIG. 3 diagrammatically exemplifies a further form of a composite lens arrangement of the invention;

FIG. 4 diagrammatically exemplifies a three-piece composite prismatic arrangement of the invention;

FIG. 5 diagrammatically exemplifies a two-piece composite prismatic arrangement of the invention; and FIG. 6 diagrammatically exemplifies another two-piece composite prismatic arrangement of the invention.

In more detail in FIG. 1, in the specific embodiment illustrated, a laser 20 generates a very narrow beam 12 of wave energy consisting of substantially monochromatic light directed parallel to and approximately along the longitudinal axis of enclosing conduit 10. Conduit 10 may, for example, be of circular cylindrical form and is shown in longitudinal cross section. It may be of metal, plastic or the like and is preferably impervious to the energy of beam 12. It will, in most instances, be filled, except for the directive devices, with a clean dry gas of low refractive index such as air, argon, nitrogen, or the like.

Beam 12 is passing through modulator and polarizer 18 is modulated with signals conveying intelligence such as speech, video, data, or the like, and is polarized in the plane of the drawing. At the far end of the conduit, not shown, appropriate demodulating, receiving, and utilization apparatus will, of course, normally be employed.

Two lens arrangements of the invention at positions A and B are illustrated. Obviously, in a long transmission system a large number of lens arrangements would be required and would in general be spaced at intervals of substantially twice the focal length of a lens arrangement, center to center. Each lens arrangement comprises a lens 16 embedded in a slab of transparent material 14. The left surface 13 of slab 14 is inclined so that the angle $\varphi$ between the normal 11 to the surface and the beam path 12 is the well known Brewster angle for the material of slab 14 so that no reflection will take place for a beam incident on this surface and polarized in the plane of incidence. The transverse axis 15 of the lens should be perpendicular to the direction of the beam after entering slab 14 and surface 17 should be at the Brewster angle for the material of slab 14 with respect to the direction of the beam after leaving slab 14.

Lens 16 may, for example, be of high quality optical glass or other suitable transparent material having a refractive index larger than that of slab 14. Alternatively, it may be of a fluid, that is, either a liquid or a gas. Slab 14 may be, for example, of a glass having a moderately lower index of refraction than the optical glass or other transparent material employed in making the lens.

In a system employing a plurality of lens arrangements of the invention, polarization may obviously be effected at the first composite lens arrangement of the invention thus relieving device 18 of the necessity of providing for polarization of the beam. Energy reflected at the front surface of the first arrangement should, in such a case, be absorbed by suitably coating the inner surface of the input end of the conduit (left end in FIG. 1) in any of numerous manners well known in the art.

Tabulated below are the refractive indices for a number of common materials.

TABLE I

| Material: | Refractive index |
|---|---|
| Air | 1.00029 |
| Carbon dioxide | 1.00045 |
| Water | 1.33 |
| Ethyl alcohol | 1.36 |
| Fused quartz | 1.46 |
| Carbon tetrachloride | 1.46 |
| Polymethyl methacrylate | 1.49 |
| Polycyclohexyl methacrylate | 1.50 |
| Telescope crown glass | 1.52 |
| Polyphenyl methacrylate | 1.57 |
| Polystyrene | 1.59 |
| Silicate flint glass | 1.62 |
| Carbon disulphide | 1.63 |
| Heavy flint glass | 1.74–1.79 |
| Diamond | 2.42 |

The refractive indices of numerous other materials are given, for example, in the Handbook of the American Institute of Physics, Table 6B–4 on p. 6–19, published by McGraw-Hill Book Company, Inc., New York, 1957.

The refractive indices of the materials of which lens 16 and slab 14 are made should be nearly the same to render reflections at their contacting surfaces or interfaces substantially negligible. They must obviously differ somewhat, the refractive index of the len 16 (if convex) normally being the larger, in order that the lens 16 will produce some converging focusing effect.

If deemed necessary, as mentioned above, the surfaces of the lens may in appropriate instances also be coated to further reduce reflection at the interfaces between the embedding slab and the embedded lens, in accordance with principles well known and extensively used by those skilled in the art.

Since the effect of the first embedded lens arrangement at position A having the slab surfaces at a clockwise Brewster angle is, as shown (in exaggerated form for emphasis) in FIG. 1, to deflect the beam to a path below the longitudinal axis of conduit 10, the surfaces of the slab of the next lens arrangement as shown at position B may be inclined at a counterclockwise Brewster angle to correct for this deviation; that is, to avoid an accumulation of such displacements throughout a long conduit employing many composite lens arrangements, alternate slabs may be rotated in one direction and intermediate slabs in the opposite direction to effect incidence of the beam at the Brewster angle in all cases. The maximum deviation from the longitudinal axis per lens arrangement can be further reduced by "splitting" it, that is, for example, by directing the ray initially along a path parallel to that above the axis, substantially as illustrated in FIG. 1, by half the total deviation. The actual beam path then is alternately one-half the total deviation above the axis and one-half the total deviation below the axis as successive lens arrangements are passed.

To recapitulate, the lens arrangements of the invention such as those illustrated at positions A and B of FIG. 1, in view of the small difference between the refractive indices of slab 14 and lens 16 cause little internal reflection at interfaces and facilitate obtaining a lens of long focal length. The use of a beam polarized in the plane of incidence, and the presentation of the external surfaces 13 and 17 of slabs 14 at the Brewster angle with respect to the path of the beam 12 eliminate reflections at the surfaces 13 and 17 of slabs 14.

It should be carefully noted that space limitations prevent the realistic illustration of the extremely long focal lengths which can be readily obtained with the slab embedded lenses of the invention. In a typical case, by way of example, slab 14 may be of crown glass, lens 16 may be of polyphenyl methacrylate, and the resulting focal length of the composite device may be substantially ten times that for the focal length of the lens 16 in air. The complete transmission systems in which it is contemplated that arrangements of the invention will be used also may be several hundreds of miles in length so that they cannot be conveniently represented in any substantially detailed showings.

FIG. 2 illustrates how advantage may be taken of the propensity of the arrangement of position A, FIG. 1, to alter the position of the ray 12 in the conduit 10 to assist in negotiating an offset of the conduit as indicated by portion 10′ at the right in FIG. 2.

The arrangement of FIG. 3 can be substantially like that of position A, FIG. 1, except that a doubly concave lens 116 is employed in place of the doubly convex lens 16. However, if the index of refraction of the material of lense 116 is lower than that of the embedding slab 114, it will still produce a convergent focusing effect. By application of the same principle, it is obvious that lens 16 of FIG. 1 can be made to produce a divergent focusing effect by embedding it in a slab of a material having a greater refractive index than that of the lens.

Alternate convergent and divergent lenses may be employed to obtain the so-called alternating gradient focusing effect as discussed, for example, in the copending joint application of D. W. Berreman and S. E. Miller, Ser. No. 379,175, filed June 30, 1964, mentioned hereinbelow.

Embedded lenses of the invention may obviously be employed only to close the ends of long conduits and intermediate lenses spaced at intervals along the conduit may be of a gaseous type such, for example, as any of those disclosed and claimed in the copending applications Ser. No. 353,689, filed Mar. 23, 1964, by D. W. Berreman; Ser. No. 379,175, filed June 30, 1964, by D. W. Berreman and S. E. Miller; or Ser. No. 379,112, filed June 30, 1964, by A. C. Beck, G. E. Conklin and A. R. Hutson, all of which applications are assigned to applicants' assignee.

In the embodiment diagrammatically exemplified in FIG. 4, a section of a circular cylindrical conduit 40 which includes a curved portion at its right end is shown in longitudinal cross section and a prism 44 embedded in a trasnparent slab 46, 47 is inserted near an end of the curved portion to change the direction of the beam to approximately follow the change in direction of the conduit.

As for the lens arrangement of FIG. 1, the materials of the slab 46, 47 and the prism 44 have nearly the same but not identical indices of refraction, so that a relatively small change in direction may be effected by prism 44 and beam 12 may conform to the downward curvature of conduit 40 to the right of the device. In general, like combinations of materials may be used in the embedded prism arrangements as are discussed above for the embedded lens arrangements.

Also, as for the embedded lens arrangements, surfaces 41 and 45 are inclined at the Brewster angle for the material of slab 46, 47 with respect to the direction of beam 12 which is polarized in the plane of the drawing so that no reflection occurs at these surfaces. Furthermore, as discussed in connection with the embedded lens arrangements, reflections at the interfaces between slab 46, 47 and prism 44 are negligible in view of the small difference between their indices of refraction and may be further reduced by conventional means as discussed for the embedded lenses.

In FIG. 5, a two-piece composite prismatic device is diagrammatically illustrated and comprises portions 50 and 52 having moderately differing refractive indices and having a combined directive effect upon beam 12 to cause it to approximately follow the curvature of the right end of conduit 40. The left surface 51 and the right surface 53 are each oriented at the Brewister angle with respect to the path of beam 12. Beam 12 is, as for prior arrangements, polarized in the plane of the paper and therefore substantially no reflection takes place at surfaces 51 and 53. Further, since the refractive indices of portions 50 and 52 differ only moderately, no substantial reflection will occur at their common interfaces 55.

In FIG. 6 an arrangement resembling that of FIG. 5 in that it employs only two portions is diagrammatically illustrated. It differs from that of FIG. 5 in that the common interface 65 is also at the Brewster angle with respect to the path of beam 12 through the device. The left and right surfaces 61 and 63 are, of course, also at the Brewster angle with respect to the path of beam 12.

Numerous and varied rearrangements and modifications of the illustrative embodiments described hereinabove within the spirit and scope of the principles of the invention will readily occur in those skilled in the art. The specific embodiments described are accordingly to be understood as being illustrative but in no sense as limiting the invention.

What is claimed is:

1. In an electromagnetic wave transmission system, a composite structure for guiding a plane polarized beam of said wave energy along a prescribed direction comprising:
   a lens made of a material having a first refractive index;
   and two outer transparent elements made of material having a second refractive index that is different than said first refractive index;
   characterized in that:
   said elements are located on opposite sides of said lens and are in contact therewith;
   and in that the exposed surfaces of said outer elements through which said beam passes are inclined at the Brewster angle with respect to said beam.

2. An electromagnetic wave transmission system wherein a plurality of said guiding structures according to claim 1 are longitudinally distributed along said system.

3. In an electromagnetic wave transmission system, a composite structure for guiding a plane polarized beam of said wave energy along a prescribed direction comprising:
   a prism made of a material having a first refractive index;
   and two outer transparent prism elements made of material having a second refractive index that is different than said first refractive index;
   characterized in that:
   said elements are located on opposite sides of said prism and are in contact therewith;
   and in that the outer exposed surfaces of said outer elements through which said beam passes are inclined at the Brewster angle with respect to said beam.

References Cited

UNITED STATES PATENTS

| | | | |
|---|---|---|---|
| 2,821,111 | 1/1958 | Coleman | 350—182 |
| 1,358,413 | 11/1920 | Brodsky | 350—152 |
| 3,179,899 | 4/1965 | Fox | 331—94.5 |
| 3,224,330 | 12/1965 | Kompfner | 350—286 X |
| 3,310,358 | 3/1967 | Marcatili | 350—189 |

FOREIGN PATENTS 301,672  12/1928  Great Britain.

DAVID SCHONBERG, *Primary Examiner.*

P. R. GILLIAM, *Assistant Examiner.*